United States Patent
Bury (10) Patent No.: US 8,605,841 B2
(45) Date of Patent: Dec. 10, 2013

(54) METHOD FOR PROCESSING RECEIVED OFDM DATA SYMBOLS AND OFDM BASEBAND RECEIVER

(75) Inventor: Andreas Bury, Dresden (DE)

(73) Assignee: Intel Mobile Communications Technology Dresden GmbH, Dresden (DE)

(*) Notice: Subject to any disclaimer, the term of this patent is extended or adjusted under 35 U.S.C. 154(b) by 3 days.

(21) Appl. No.: 13/246,887

(22) Filed: Sep. 28, 2011

(65) Prior Publication Data

US 2012/0082274 A1    Apr. 5, 2012

(30) Foreign Application Priority Data

Oct. 1, 2010  (EP) ..................................... 10186152

(51) Int. Cl.
    *H03D 1/04*    (2006.01)
(52) U.S. Cl.
    USPC ........... 375/346; 375/260; 375/347; 375/349; 375/267; 375/285; 708/205; 708/805; 708/801; 708/808; 708/803; 455/501; 455/63.1; 455/67.13; 455/226.1; 455/296
(58) Field of Classification Search
    USPC ................ 375/260, 346, 347, 349, 267, 285; 708/205, 805–808, 801; 455/501, 63.1, 455/67.13, 226.1, 296
    See application file for complete search history.

(56) References Cited

U.S. PATENT DOCUMENTS

| | | | | |
|---|---|---|---|---|
| 2003/0076900 A1* | 4/2003 | Magee et al. | ................. | 375/316 |
| 2007/0098120 A1* | 5/2007 | Wang | ............................ | 375/346 |
| 2010/0067627 A1* | 3/2010 | Lincoln et al. | ................ | 375/346 |

\* cited by examiner

*Primary Examiner* — Daniel Washburn
*Assistant Examiner* — Rahel Guarino
(74) *Attorney, Agent, or Firm* — SpryIP, LLC (57) ABSTRACT

A method is provided for processing received data symbols in an orthogonal frequency division multiplexing (OFDM) transmission scheme, and an OFDM baseband receiver which performs this method, in order to support frequency selective noise estimation, especially in interference limited environments, and to offer improved estimation performance and reduced computational complexity. This is achieved by determining time and frequency selective levels of combined noise and interference, computing noise normalization values for a respective time-frequency region of the time-frequency plane that applies in the transmission scheme employed, from the time and frequency selective noise plus interference levels, applying the noise normalization values to the received data symbols to obtain normalized data symbols, applying the noise normalization values to the channel estimates, to obtain normalized channel estimates, determining communication parameter estimates from the normalized channel estimates, and determining demodulated and decoded data from the normalized data symbols using the normalized channel estimates.

12 Claims, 7 Drawing Sheets

METHOD FOR PROCESSING RECEIVED OFDM DATA SYMBOLS AND OFDM BASEBAND RECEIVER

CROSS REFERENCE TO RELATED APPLICATIONS

This application claims priority of European application No. 10186152.4 filed on Oct. 1, 2010, the entire contents of which is hereby incorporated by reference herein.

FIELD OF THE INVENTION

The invention relates to a method for processing received data symbols in an orthogonal frequency division multiplexing (OFDM) transmission scheme, and also relates to an OFDM baseband receiver.

BACKGROUND OF THE INVENTION

Orthogonal frequency division multiplexing (OFDM) has been widely adopted for a variety of wireless communication standards, such as WLAN IEEE 802.11a/g, DAB, TDMB, DVB-T, WiMax, and also 3GPP LTE. Due to its potential for low complexity receiver implementation, OFDM is particularly attractive for high-data rate transmission.

Figure 1:
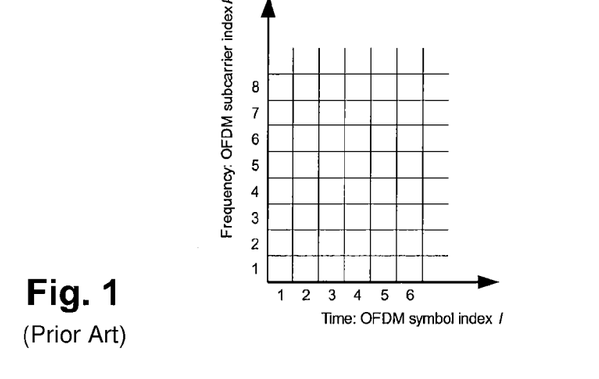
FIG. 1 illustrates a time-frequency plane used in OFDM to define symbols.

In OFDM, the transmission bandwidth is split into equidistantly spaced orthogonal sub-bands of identical width. Orthogonality is maintained under the prerequisite that the duration of the channel impulse response does not exceed the duration of the guard interval, and if the radio propagation channel conditions vary slowly enough. Both requirements are satisfied by proper selection of system parameters, such as subcarrier spacing and guard interval duration. Then transmission of one data symbol is described by the simple equation $$y_{k,l} = h_{k,l} x_{k,l} + n_{k,l} \quad (1).$$

Here x is a transmitted symbol, h is a complex fading coefficient, n is a random noise sample, y is the corresponding received symbol, k is the OFDM subcarrier index, and l is the OFDM symbol index. The noise sample is characterized by the noise variance $\sigma_n^2$. With different values for all different pairs of (k,l), this equation holds for all symbols in the time-frequency plane which is illustrated in FIG. 1. The above holds for a communication scheme with one transmit (Tx) antenna.

An OFDM communication scheme where multiple antennas are used both on the transmit side and the receive side is known as multiple-input multiple-output (MIMO) OFDM. In this case, each element in the time-frequency plane corresponds to the equation $$y_{k,l} = H_{k,l} x_{k,l} + n_{k,l} \quad (2),$$

where x is a vector of transmitted symbol, H is a matrix of complex fading coefficients, n is a random noise sample vector, y is the corresponding received symbol vector. The random noise vector is characterized by its covariance matrix $\Phi_{nn}$.

Figure 2:
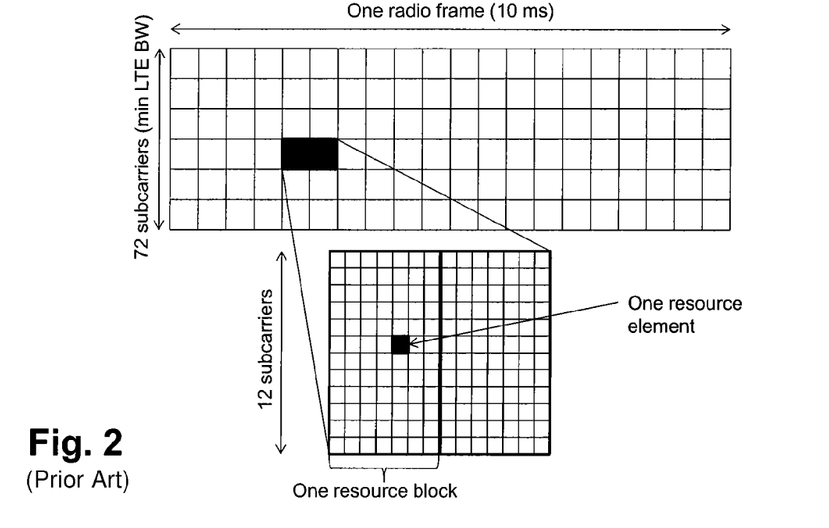
FIG. 2 shows an LTE time-frequency grid.

In a multi-user system, where transmission occurs from one transmitter to multiple receivers, regions in the time-frequency plane may be assigned to different users. The 3GPP LTE standard employs this kind of orthogonal frequency division multiple access (OFDMA) in the downlink, i.e. the transmission direction from a base station to a terminal. In LTE each element in the time-frequency plane is referred to as a resource element, and the entire time-frequency plane is divided into so-called resource blocks, which are rectangles of 12 subcarriers in frequency direction times 6 or 7 (depending on the cyclic prefix duration mode) OFDM symbols in time direction, as illustrated in FIG. 2.

Figure 3:
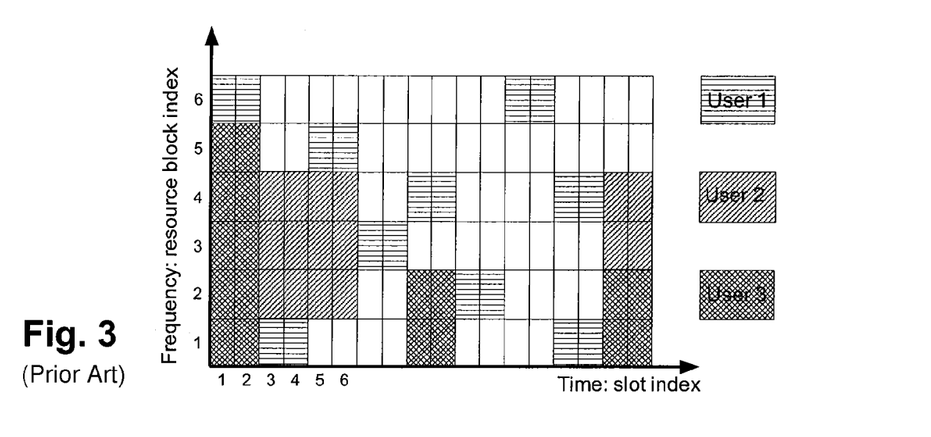
FIG. 3 illustrates an exemplary allocation of resource elements to users.

As illustrated in FIG. 3, a resource block as a whole is assigned to a specific user.

Depending on the network load, resource blocks may also be unused, i.e., not allocated to any user.

Figure 4:
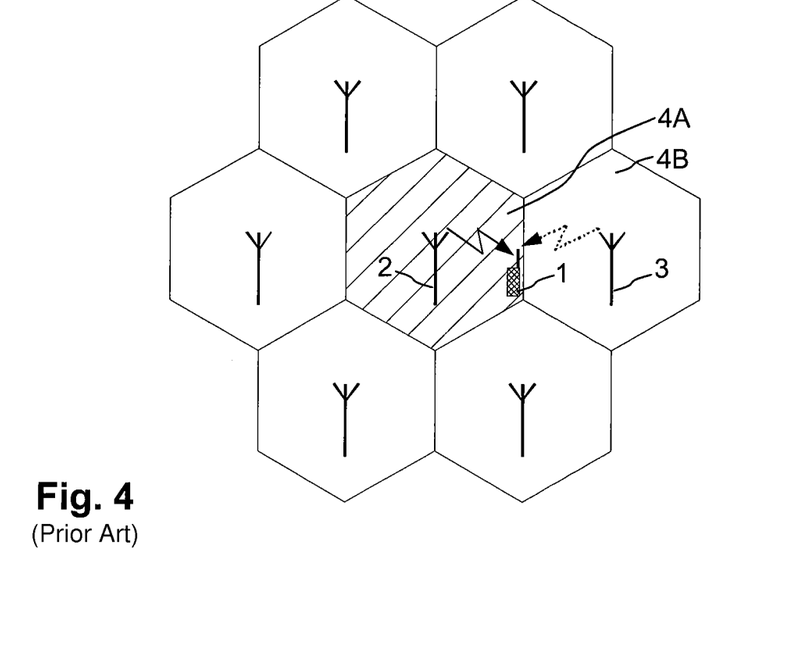
FIG. 4 illustrates a simplified scheme of an LTE cellular network.

The LTE standard describes a cellular network, where a supplied area is split into cells, each cell being equipped with a base station which serves the mobile stations in that cell. In LTE terminology a base station is referred to as an "evolved Node B" (eNB), and a mobile station or terminal is referred to as user equipment (UE). A simplified scheme of such a network is shown in FIG. 4. A communication terminal 1 is located in cell 4A near the border to an adjacent cell 4B. Terminal 1 is served by a base station 2. Terminal 1 will also receive signals transmitted by base station 3 of cell 4B that are, however, intended for another terminal (not shown) which is located in cell 4B.

In LTE, all cells of a network operate at the same center frequency, i.e., the frequency re-use factor is 1, which means that any mobile station will experience interference from neighboring cells in the network. The interference from a neighboring cell depends on the patterns of used and non-used resource blocks in the adjacent cells. To give an example, we assume, at a specific point in time, a resource block allocation as depicted in FIG. 3 to be valid in cell 4A, and a different resource block allocation, not shown, to be valid in the neighboring cell 4B. In the allocation scheme of FIG. 3 resource blocks with resource block index 5 and slot indices 5 and 6 are allocated to user 1 (terminal 1 in FIG. 4). In case these resource blocks in the frequency-time plane are concurrently used in cell 4B, i.e. allocated to another user (not shown), communication of terminal 1 when located near the border to cell 4B will be interfered from cell 4B. In case the same resource blocks are not allocated in cell 4B, there will be no interference on the communication of terminal 1 for signals in these resource blocks. From this example it will readily be understood that inter-cell interference varies in time and frequency. Particularly at the boundary between two cells, the level of received interference from the neighboring base station in those portions of the time-frequency plane where the interfering base station has resource blocks allocated to its own served users, will typically be significantly higher than the thermal noise of the receiver. Interference coordination between base stations of adjacent cells targets at keeping interference levels low.

Due to processing complexity constraints and limited bandwidth resources, when a network becomes more and more loaded with users, reception at a mobile station turns more and more from a noise limited operation to an interference limited operation. In addition, the communication channel towards an interfering base station is time variant and frequency selective. Thus, when a mobile station receives signals in an LTE network, the composite of noise and interference is generally varying both in time and frequency directions.

In a mobile radio receiver, in order to enable reliable data reception, a number of parameter estimation tasks need to be performed, e.g., time synchronization estimation, frequency synchronization estimation, channel estimation, interference level estimation, Doppler spread estimation, power delay profile estimation, feedback information estimation. Many existing OFDM receiver implementations are designed for a noise level which is constant across the employed frequency band. However, to achieve the highest data throughput in presence of time and frequency selective level of noise plus interference, the data demodulation and parameter estimation algorithms should take into account the characteristics of noise and interference.

Advanced error correcting codes are applied for reliable communication, e.g., LTE utilizes a so-called Turbo code. In a receiver the decoder is fed with softbits referred to as log likelihood ratio (LLR) values for optimum decoding results. For the example of a simple BPSK (Binary Phase Shift Keying) transmit symbol alphabet, comprising two symbols $x \in \{-1,1\}$, an LLR value is computed as $$L = \frac{\log(p(y|x=1))}{\log(p(y|x=-1))} = 4 \cdot \operatorname{Re}\left\{\frac{h^* \cdot y}{\sigma_n^2}\right\}. \tag{3}$$

Thus, computation of these LLR values requires knowledge about the noise level. If the noise level varies among received symbols of one codeword, respective noise levels for all symbols must be considered in the computation of respective LLR values, which are fed into the decoder. Equation (3) applies to the single-input-single output (SISO) case, i.e. where there is one transmit antenna and one receive antenna. In a case where signals from multiple receive antennas are available, the equation becomes $$L = \frac{\log(p(y|x=1))}{\log(p(y|x=-1))} = 4 \cdot \operatorname{Re}\{H^H \cdot \Phi_{nn}^{-1} \cdot y\}. \tag{4}$$

The covariance matrix in this equation contains noise variances corresponding to all receive antennas on the main diagonal, and also the respective noise co-variances on the side diagonals. Assuming that all co-variances are zero, this equation describes what is known as maximum-ratio combining: Received symbols of all antennas are normalized by the respective noise variances and multiplied by corresponding channel amplitudes. When the side diagonals in the covariance matrix are non-zero, the equation describes optimum combining even in presence of noise correlation between receive antennas.

Figure 5:
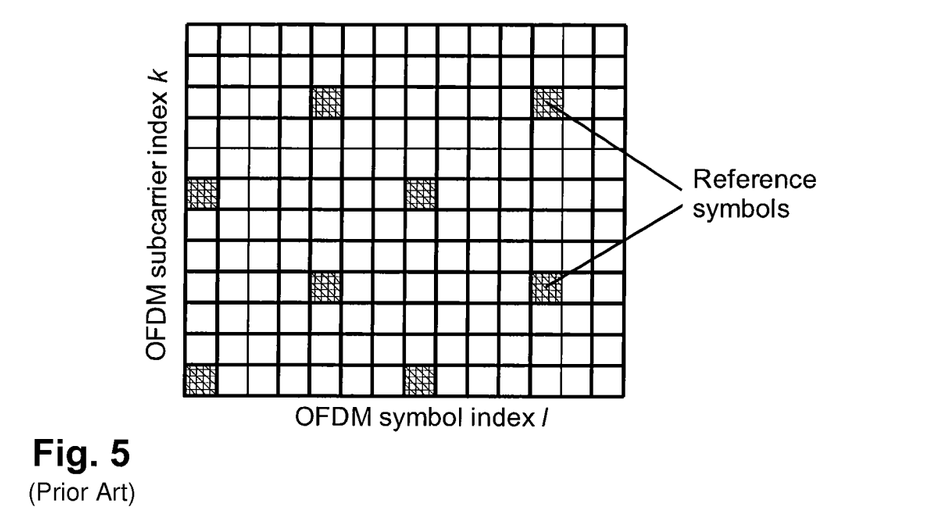
FIG. 5 illustrates an example for positioning reference symbols in the time-frequency plane of FIG. 1.

In a number of OFDM transmission schemes including LTE downlink, reference symbols are multiplexed into the time-frequency plane such as illustrated in FIG. 5. Reference symbols are data symbols which are known at the receiver and are used for parameter estimation tasks.

In an OFDM receiver, a number of parameter estimation tasks may be carried out using simple scalar products of vectors. For complex vectors a and b of length M, a scalar product is defined as $$s = \sum_{m=1}^{M} a_m \cdot b_m^*. \tag{5}$$

For example, when a and b are vectors of demodulated reference symbols from distinct OFDM symbols with a certain time gap in between, the angle of the scalar product s provides information on the residual frequency offset. Thus, this scalar product may serve as a frequency offset estimator used for frequency tracking. In practice, the values in the scalar product are all composed of an actual value plus a random noise term, $a_m = a_{actual,m} + a_{noise}$, $b_m = b_{actual,m} + b_{noise,m}$ with $a_{noise,m}$, $b_{noise,m}$ being zero-mean Gaussian noise with respective variances $\sigma_{a,m}^2$ and $\sigma_{b,m}^2$. Then the scalar product based on noise-normalized vectors, $$s_{norm} = \sum_{m=1}^{M} \frac{a_m \cdot b_m^*}{\sigma_{a,m} \cdot \sigma_{b,m}} \tag{6}$$

offers the best possible consideration of respective noise variances, and thus, an optimum estimator. In addition, the absolute value of the computed scalar product provides a reliability figure on the estimation result, namely the angle.

LTE supports a number of link adaptation methods, in order to provide a certain quality of service (QoS) to mobile users. The modulation and coding scheme, i.e., the modulation alphabet (QPSK, 16-QAM, or 64-QAM) and the coding rate are adapted to the given link conditions, in order to meet a targeted maximum packet error rate. To meet that target, a mobile station sends a proposal for the choice of a modulation and coding scheme to the base station (channel quality indication—CQI). In addition there exists a MIMO transmission mode utilizing implicit beam-forming via precoding, which allows improved utilization of the spatial channel dimension. In this mode, the mobile station sends a proposal for the number of transmission layers (rank indication—RI) and best precoding matrix (precoding matrix index—PMI). The mobile station obtains all this feedback information based on an assessment of the channel conditions and sends its proposals to the base station. Typically, all this feedback information (FBI) is computed based on the signal-to-noise ratio which will be obtained after equalization.

A general concept of an OFDM receiver is e.g. described by J. Berkmann et al., "On 3G LTE Terminal Implementation—Standard, Algorithms, Complexities and Challenges", International Wireless Communications and Mobile Computing Conference, Aug. 6-8, 2008, Crete Island, Greece.

Algorithms considering non-constant noise/interference levels have been described in literature, both for data demodulation and aspects of parameter estimation. To optimally cope with time and frequency selective interference, the receiver data demodulation, and also most parameter estimation tasks need to take into account the non-constant interference level. Demodulation and parameter estimation algorithms considering time/frequency-selective interference are typically more computationally intense than algorithms treating interference as a constant. Thus, when all parameter estimation algorithms individually take into account non-constant noise/interference, the added computational complexity to optimally consider non-constant rather than constant noise/interference is significant.

The object of the invention, therefore, is to provide an OFDM baseband receiver architecture which supports frequency selective noise estimation, and especially frequency selective soft-metric weighting for interference limited environments. A more general object of the invention is to suggest an OFDM baseband receiver architecture and reception method with improved estimation performance and reduced computational complexity which directly translates into reduced costs, both in terms of manufacturing and power consumption.

SUMMARY OF THE INVENTION

According to the invention there is provided a method for processing received data symbols in an orthogonal frequency division multiplexing (OFDM) transmission scheme which comprises determining noise level estimations and channel estimations from the received symbols, for both data demodulation and decoding and parameter estimation tasks. The step of determining noise level estimations comprises estimating time and frequency selective levels of combined noise and interference, and the method further comprises computing noise normalization values for a respective time-frequency region of the time-frequency plane that applies in the transmission scheme employed, from said time and frequency selective noise plus interference levels, applying said noise normalization values to the received data symbols to obtain normalized data symbols, applying said noise normalization values to the channel estimates, to obtain normalized channel estimates, determining communication parameter estimates from said normalized channel estimates, and determining demodulated and decoded data from said normalized data symbols using said normalized channel estimates.

The communication parameter determining step may comprise time offset estimation, frequency offset estimation, Doppler spread estimation, power delay profile estimation and feedback information including at least one of channel state information (CQI), rank index (RI), and precoding matrix index (PMI).

The invention also provides an orthogonal frequency division multiplexing (OFDM) baseband receiver that uses the above method for demodulating and decoding data, and for estimating communication parameters.

Advantageously, the OFDM baseband receiver of the invention supports centralized time and frequency selective consideration of the noise plus interference level by time and frequency selective estimation of noise and interference levels and computation of time and frequency selective normalization values based upon estimated levels of cumulative noise and interference. The computed normalization values are applied to corresponding (in the time-frequency plane) received noisy data symbols and estimated channel transfer function values such that the noise variance on normalized data symbols is constant across the time-frequency plane. The normalized data symbols and corresponding normalized channel transfer functions can be used for the joint task of equalization and log likelihood ratio computation. The normalized channel transfer functions can be used to compute feedback information, i.e., estimate of channel rank, best precoding matrix, and proposed modulation and coding scheme. The normalized channel transfer functions can also be used for parameter estimations such as frequency offset estimation, time offset estimation, Doppler spread estimation, power delay profile estimation, in particular in algorithms employing scalar products of vectors.

In contrary to conventional OFDM receiver architectures, the invention treats interference as non-constant both in time and frequency direction. Moreover, the invention advantageously employs a centralized approach to consider time-frequency selective interference in multiple algorithms such as data equalization and multiple parameter estimation tasks.

The invention offers a performance advantage when compared with conventional OFDM receiver architectures which treat interference as a constant in the frequency direction. Also, the invention offers a complexity advantage when compared to conventional receiver architectures in which time/frequency selective interference is treated separately in the several data demodulation and parameter estimation algorithms employed. Thus, the invention provides a unified architecture of a low complexity OFDM receiver for high performance in presence of time-variant and frequency-selective interference. In particular in scenarios of severe time-frequency selective interference, a considerable performance advantage will be obtained over receivers where further parameter estimations such as time offset estimation and frequency offset estimation are performed using channel estimates without compensating for the time/frequency selective variance of noise plus interference.

BRIEF DESCRIPTION OF THE DRAWINGS

Additional features and advantages of the present invention will be apparent from the following detailed description of specific embodiments which is given by way of example only and in which reference will be made to the accompanying drawings, wherein.

DETAILED DESCRIPTION

Figure 6:
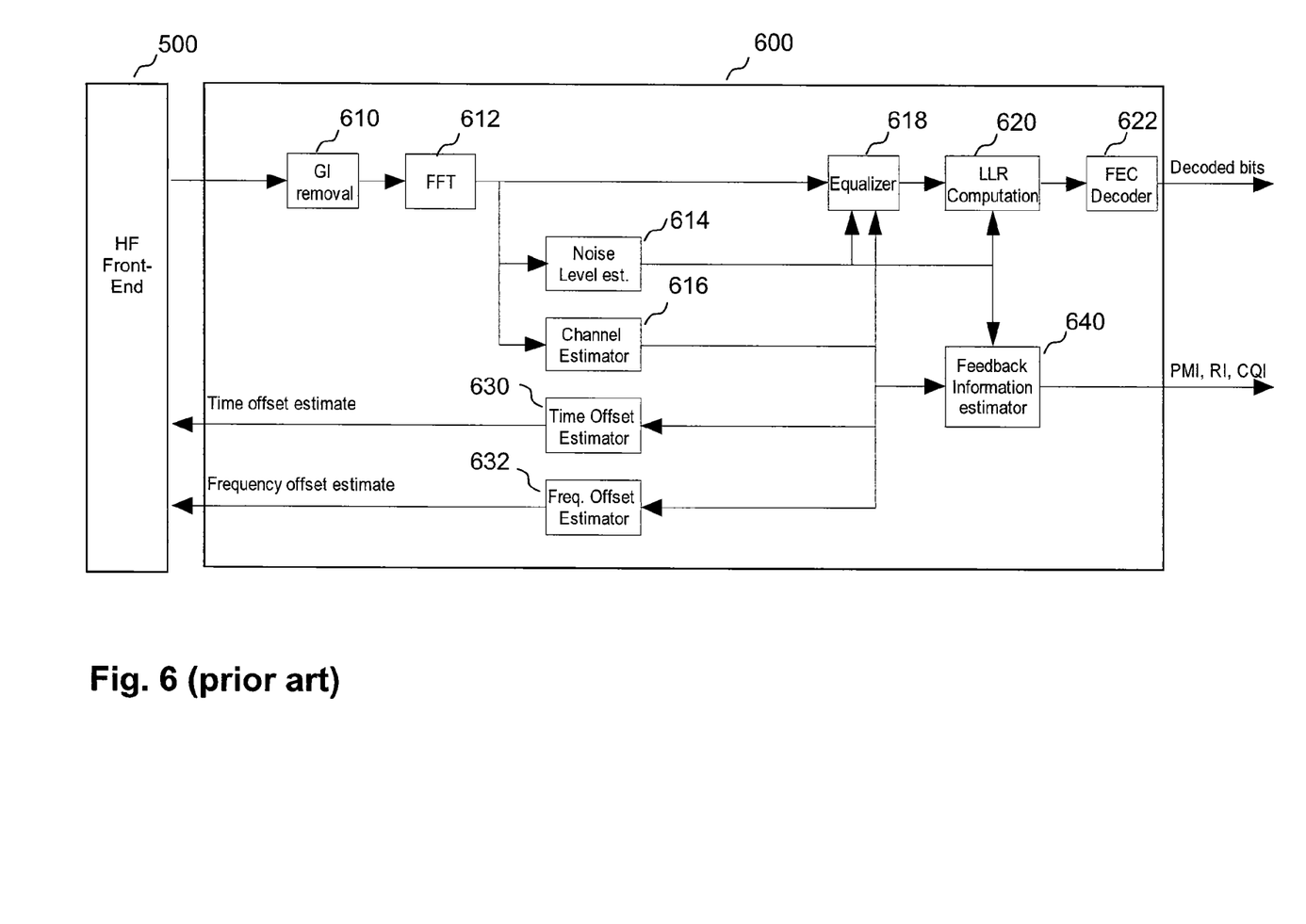
FIG. 6 shows a simplified block diagram of a known architecture of an LTE baseband receiver.

FIG. 6 shows a simplified block diagram of an exemplary conventional LTE baseband receiver. After guard interval (GI) removal at 610, blocks of the received signal are processed via fast Fourier transform (FFT), at 612, to convert received time domain symbols into frequency domain. A number of processed FFT blocks form a time-frequency plane consisting of received data symbols and reference symbols. Channel estimation, at 616, and noise level estimation, at 614, is typically performed based on reference symbols. Data symbols and corresponding channel estimates are equalized, at 618, and then log likelihood values are computed, at 620, and fed into a deinterleaving/decoding unit 622 which obtain decoded data from the equalized and scaled symbols. Data bits output from forward error correcting (FEC) decoder 622 include control bits and payload bits.

Channel estimates from 616 are also fed into time offset estimator 630 and frequency offset estimator 632 to compute time and frequency offset estimates, respectively, that are used for time and frequency tracking loops between an analog RF front-end 500 and baseband receiver 600. This frequency and time tracking is performed to improve both inter-symbol interference (ISI), and inter-carrier interference (ICI). Especially, ISI is introduced by poor time tracking, whereas a good time synchronization ensures correct removal of the guard interval (GI) which is also known as a cyclic prefix (CP). ICI is introduced by poor frequency tracking, i.e. the carrier frequency may shift due to temperature variations etc.

Additionally, the channel estimates from 616 and the noise level estimate from 614 are fed into a feedback information estimator 640, which computes feedback information (FBI) that is returned to the base station. Feedback information in particular are channel state information (CQI), a rank index (RI) which indicates the rank of the channel matrix which in turn is an indication of the number of receive antennas that supply assessable signals, and a precoding matrix index (PMI) which are required for channel state information reporting to the base station.

Figure 7:
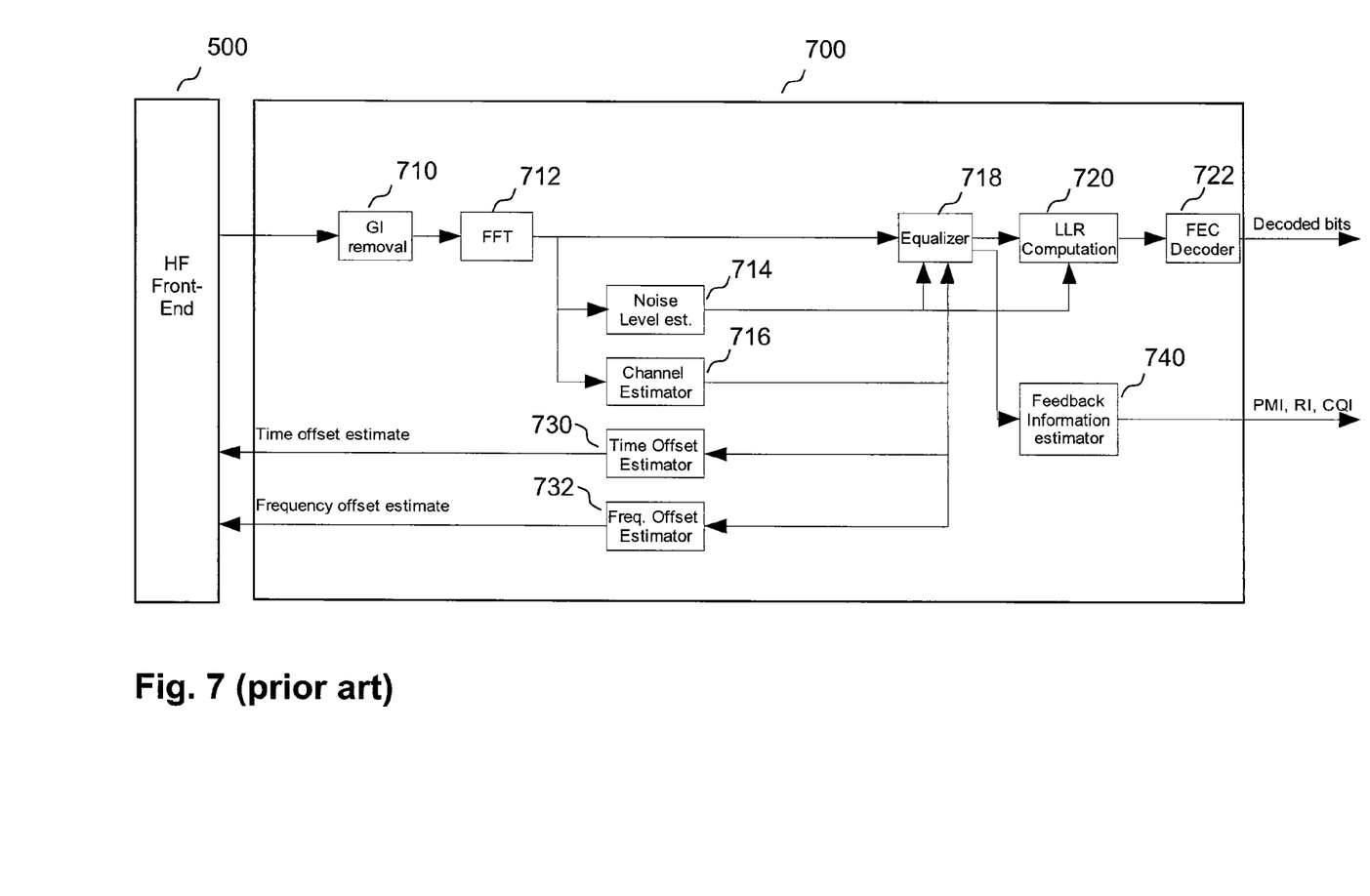
FIG. 7 shows a simplified block diagram of another known LTE baseband receiver.

FIG. 7 shows another known implementation of an LTE baseband receiver which derives feedback information such as PMI, RI, and CQI based on intermediate results that are available in equalizer 718.

In conventional OFDM receiver implementations such as illustrated in FIGS. 6 and 7, noise level estimation is performed on a per-OFDM-symbol basis, yielding a result which describes the average noise level across the frequency band.

Figure 8:
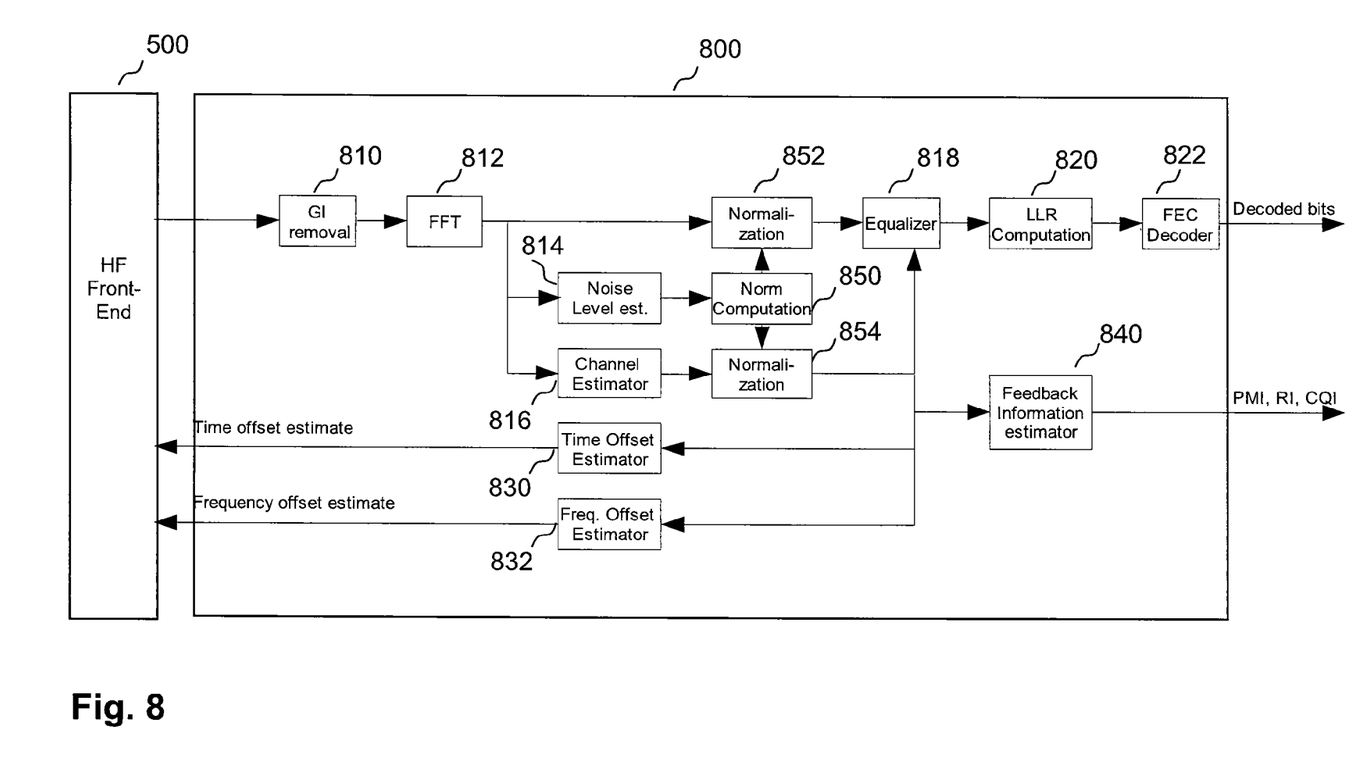
FIG. 8 shows a simplified block diagram of an LTE baseband receiver according to one embodiment of the invention.

FIG. 8 shows an OFDM baseband receiver according to an exemplary embodiment of the invention. The OFDM baseband receiver comprises guard interval (GI) removal means 810, means 812 for fast Fourier transform to provide frequency domain symbols, means 816 for estimating the channel transfer function, means 814 for estimating the composite level of noise and interference, means 818 for equalizing data symbols, means 820 for computing log likelihood ratios, means 822 for decoding softbits to provide decoded data bits, means 830 for time offset estimation, means for frequency offset estimation 832, and means 840 for feedback information computation.

Figure 10:
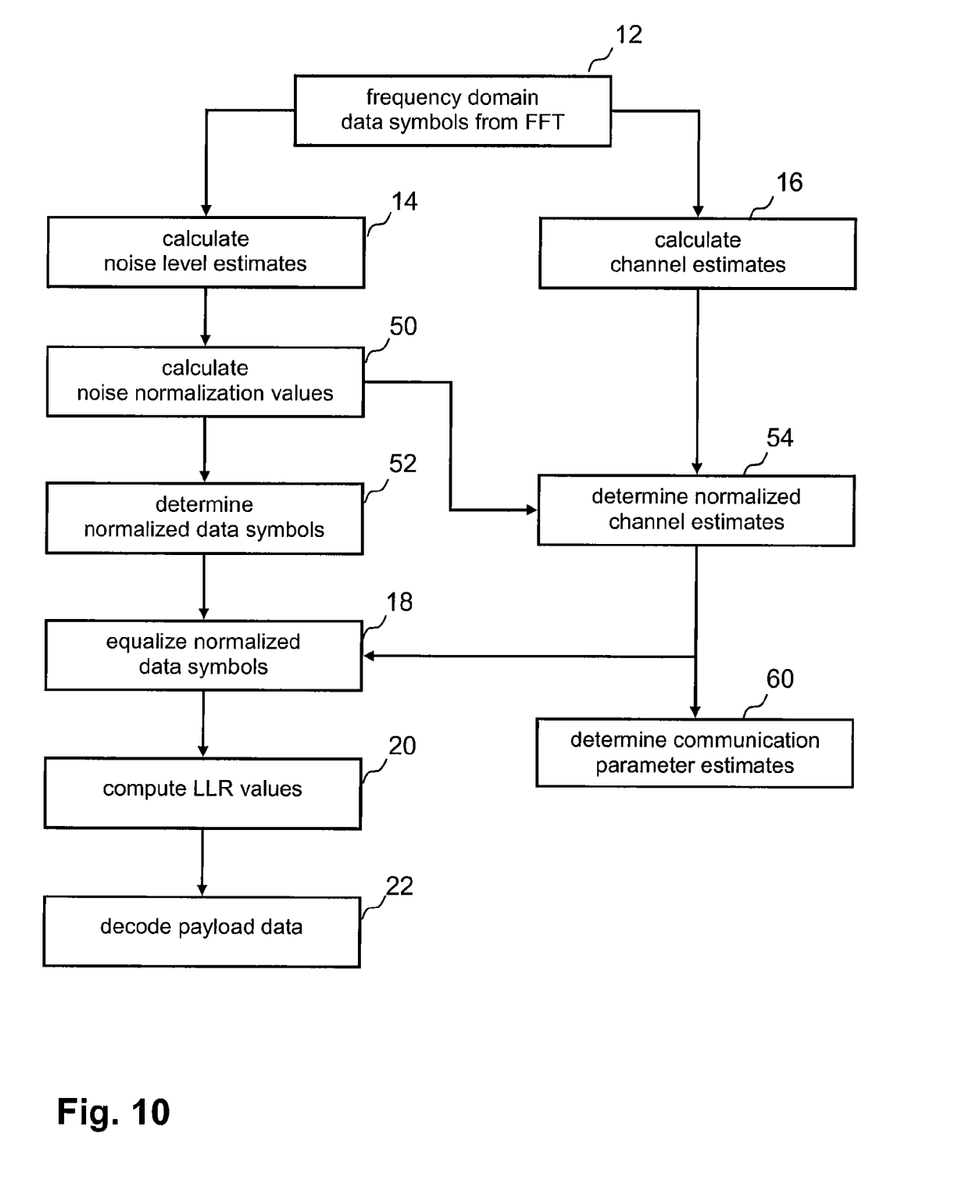
FIG. 10 shows a method for processing received signals in an OFDM baseband receiver according to the invention.

The method for processing received signals in an OFDM baseband receiver according to the invention is summarized in FIG. 10. The frequency domain data symbols which are output by FFT block 812 are used to calculate noise plus interference level estimates, at 14, and channel estimates, at 16. In step 50 noise normalization values are calculated from the noise plus interference level estimates obtained in step 14. These noise normalization values are, on the one hand applied to the received data symbols to obtain normalized data symbols, in step 52, and on the other hand to the channel estimates output by block 816 to obtain normalized channel estimates, in step 54. The normalized data symbols from step 52 and the normalized channel estimates from step 54 then are used further demodulate and decoded data. Especially, the normalized data symbols from step 52 are equalized in step 18 using the normalized channel estimates. In step 20 LLR values, i.e. soft-bits, are computed from the equalized and normalized data symbols, from which then, at step 22 the transmitted data can be decoded. Furthermore, the normalized channel estimates from step 54 are used for parameter estimation, at step 60. Parameters estimated in step 60 are e.g. time and frequency offset estimates, respectively, that are used for time and frequency tracking loops between a digital baseband receiver such as 800, 900 and an analog RF front-end such as 500 in an OFDM receiver arrangement. Other parameters are feedback information such as CQI, PMI, and RI which a mobile station sends to the serving base station for optimizing communication conditions, as explained above in the introductory part.

The method steps of FIG. 10 will now be explained in detail in conjunction with the exemplary baseband receiver illustrated in FIG. 8.

Noise level estimator means 814 computes a plurality of noise level estimates, which may generally be different in time and frequency direction. These noise level estimates are used to obtain noise normalization values g or G, at 850.

In the case of one receive antenna, $g=1/\sqrt{\sigma_n^2}$, with $\sigma_n^2$ being the estimated noise variance applied for a time/frequency region of received data symbols.

In the case of multiple receive antennas, either the above is individually applied per receive antenna, which may be described as a diagonal normalization matrix $G=\text{diag}(g_1 \ldots g_R)$, where R is the number of receive antennas, or to additionally compensate for noise correlation between receive antennas: $G \cdot G^H = \Phi_{nn}^{-1}$, i.e., $G = \text{chol}(\Phi_{nn})^{-1}$ being the inverse of the Cholesky factorization of the noise covariance matrix.

The noise normalization values from 850 are applied to both, received data symbols, at 852, and to the computed channel estimates, at 854, which is expressed as follows:

In the case of one receive antenna: $y_n = g \cdot y$, $h_n = g \cdot h$

In the case of multiple receive antennas: $y_n = G \cdot y$, $H_n = G \cdot H$.

Noise normalized data symbols from 852 and noise normalized channel estimates from 854 are fed into equalizer 818. Equalizer 818 has no extra input for a noise level estimate, so its internal implementation is simplified as compared to conventional equalizers 618, 718 of FIGS. 6 and 7.

The output from equalizer 818 is fed directly into LLR computation means 820, so LLR computation means 820 has no extra input for a noise level estimate which simplifies its internal implementation as compared to conventional LLR computation means 620, 720 of FIGS. 6 and 7.

Normalized channel estimation data from 854 are fed into feedback information estimator 840, so feedback information estimator 840 has no extra input for a noise level estimate which simplifies its internal implementation as compared to conventional feedback information estimator 640, 740 of FIGS. 6 and 7.

Moreover, normalized channel estimation data from 854 are fed into time offset estimator 830 and frequency offset estimator 832. In contrast to using non-normalized channel estimation data as is the case in conventional time and frequency offset estimators 630, 730 and 632, 732 of FIGS. 6 and 7, respectively, time and frequency offset estimators 830, 832 of the invention use the normalized channel estimation data from 854, thus obtaining an improved estimation performance in presence of frequency-selective interference.

Figure 9:
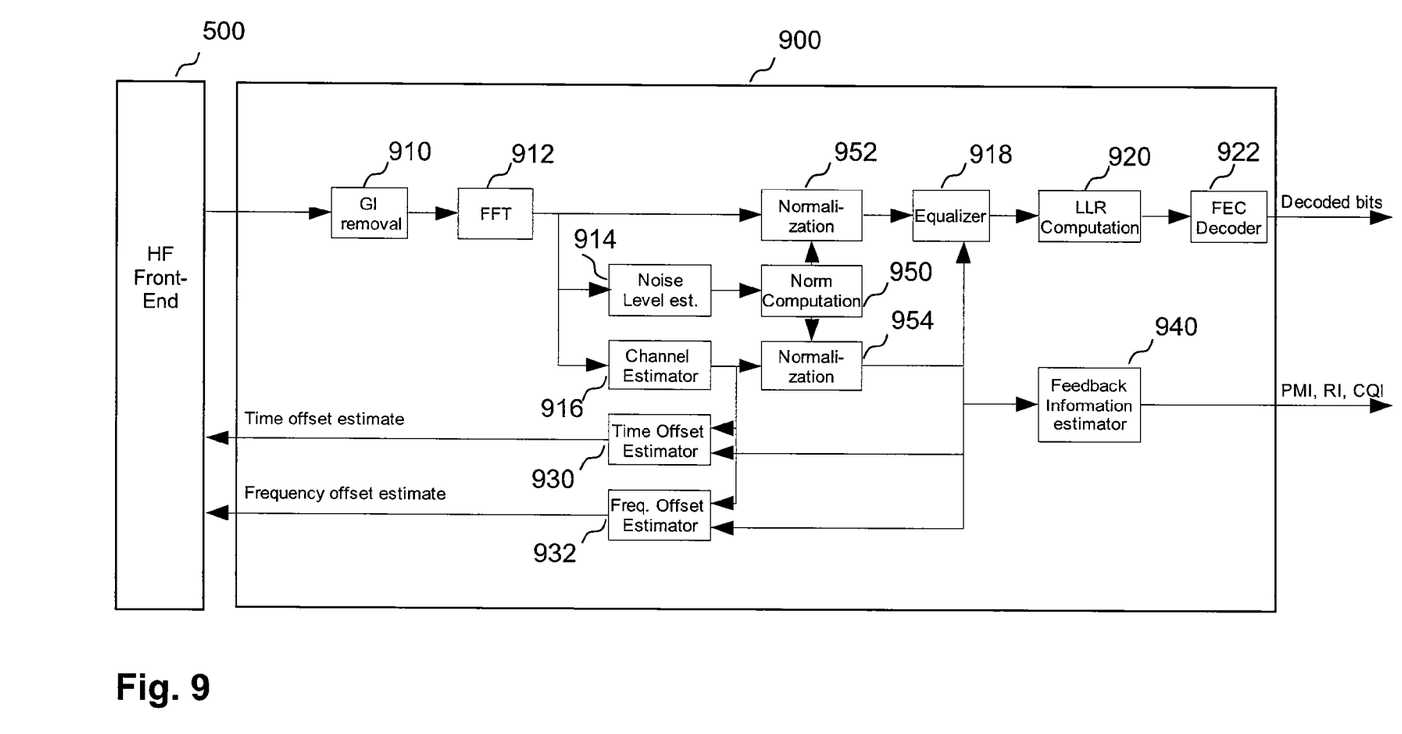
FIG. 9 shows a simplified block diagram of an LTE baseband receiver according to another embodiment of the invention.

FIG. 9 shows a second embodiment of the invention. Though not explicitly illustrated in the figure, the baseband receiver of FIG. 9 may comprise a first switching means which selectively couples the output of channel estimator 916 or the output of channel normalization unit 954 with time offset estimator 930, and a second switching means which selectively couples the output of channel estimator 916 or the output of channel normalization unit 954 with frequency offset estimator 932. In this way time and frequency offset estimators 930 and 932, respectively, can selectively provide an initial estimate based on channel estimation results from 916, and an improved estimate using normalized channel estimation results from 954.

Due to the latency of the individual process steps it might be desirable in some of the various operation scenarios supported by LTE to have a first rough estimation of both time and frequency offset. Such a scenario is e.g. in a persisting reception mode where this first estimates may be used for a rough offset correction, and at a later time when the normalized channel estimates are available, it can be used to better compensate for this offset to improve reception quality.

The embodiments of OFDM baseband receiver according to the invention that has been described with reference to FIGS. 8 and 9 both provide a robust frequency and time tracking, which considerably contributes to reduce both ISI and ICI in interference limited environments which are likely to occur in LTE communication schemes, especially in mobile applications.

The invention claimed is:

1. A method for processing received data symbols in an orthogonal frequency division multiplexing (OFDM) transmission scheme, comprising:
   determining noise level estimations and channel estimations from the received data symbols, for data demodulation and parameter estimation processing, wherein the step of determining noise level estimations comprises estimating time and frequency selective levels of combined noise and interference;
   computing noise normalization values (g,G) for a respective time-frequency region of a time-frequency plane that applies in the OFDM transmission scheme employed, from said time and frequency selective noise plus interference levels;
   applying said noise normalization values to the received data symbols to obtain normalized data symbols;
   applying said noise normalization values to the channel estimates, to obtain normalized channel estimates;
   determining communication parameter estimates from said normalized channel estimates; and
   determining demodulated and decoded data from said normalized data symbols using said normalized channel estimates.

2. The method of claim 1, wherein said noise normalization values computing step comprises obtaining noise normalization values (g) for data symbols received from a single receive antenna according to $g=1/\sqrt{\sigma_n^2}$, wherein $\sigma_n^2$ is an estimated noise variance of the time-frequency region of the received data symbols.

3. The method of claim 2, wherein said noise normalization values computing step comprises obtaining noise normalization values (G) for data symbols received from a plurality of receive antennas, according to $G=\text{diag}(g_1 \ldots g_R)$ wherein R is number of receive antennas.

4. The method of claim 1, wherein said noise normalization values computing step comprises obtaining noise normalization values (G) for received data symbols received from a plurality of receive antennas as an inverse of Cholesky factorization of noise covariance matrix $\Phi_{nn}$ according to $G=\text{chol}(\Phi_{nn})^{-1}$, with $G \cdot G^H = \Phi_{nn}^{-1}$.

5. The method of claim 1, wherein said steps of applying the calculated noise normalization values (g, G) to corresponding received noisy data symbols and estimated channel transfer function values is performed such that noise variance on normalized data symbols is constant across the time-frequency plane.

6. The method of claim 1, wherein said communication parameter determining step comprises determining at least one of time offset estimations, frequency offset estimations, Doppler spread estimations, power delay profile estimations, channel state information (CQI) estimations, rank index (RI) estimations, and precoding matrix index (PMI) estimations.

7. An orthogonal frequency division multiplexing (OFDM) baseband receiver, comprising:
   means for estimating a noise level, and means for estimating channel conditions from received data symbols;
   means for demodulating and decoding data, and means for estimating communication parameters using said noise level and channel estimates; wherein
   said noise level estimating means are operative to estimate time and frequency selective levels of combined noise and interference; and the baseband receiver further comprising:
   means for computing noise normalization values (g, G) for a respective time-frequency region of a time-frequency plane of an OFDM transmission scheme employed, from said time and frequency selective noise plus interference levels;
   means for applying said noise normalization values to the received data symbols to obtain normalized data symbols; and
   means for applying said noise normalization values to the channel estimates, to obtain normalized channel estimates; and wherein:
   said communication parameter estimating means are operative to determine communication parameters from said normalized channel estimates; and
   said data demodulating and decoding means are operative to determine transmitted data from said normalized data symbols using said normalized channel estimates.

8. The baseband receiver of claim 7, which receives data symbols derived from a single receive antenna and wherein said noise normalization values computing means is adapted to determine noise normalization values (g) for the received data symbols according to $g=1/\sqrt{\sigma_n^2}$, wherein $\sigma_n^2$ is an estimated noise variance of the time-frequency region of the received data symbols.

9. The baseband receiver of claim 7, which receives data symbols derived from a plurality of receive antennas and wherein said noise normalization values computing means is adapted to determine noise normalization values (G) for the received data symbols according to $G=\text{diag}(g_1 \ldots g_R)$ wherein R is number of receive antennas.

10. The baseband receiver of claim 7, which receives data symbols derived from a plurality of receive antennas and wherein said noise normalization values computing means is adapted to determine noise normalization values (G) for the received data symbols as an inverse of Cholesky factorization of noise covariance matrix $\Phi_{nn}$ according to $G=\text{chol}(\Phi_{nn})^{-1}$, with $G \cdot G^H = \Phi_{nn}^{-1}$.

11. The baseband receiver according to claim 7, further comprising time offset estimation means, frequency offset estimation means, and feedback information estimation means, wherein said feedback information is at least one of channel state information (CQI), rank index (RI), and precoding matrix index (PMI).

12. The baseband receiver of claim 11, further comprising a first switching means which selectively couples an output of said channel estimation means or an output of said means for obtaining normalized channel estimates with said time offset estimation means, and a second switching means which selectively couples an output of said channel estimation means or an output of said means for obtaining normalized channel estimates with said frequency offset estimation means.

* * * * *